United States Patent [19]

Marchent et al.

[11] Patent Number: 4,539,760
[45] Date of Patent: Sep. 10, 1985

[54] COMPASS

[75] Inventors: Brian G. Marchent, Portsmouth; Michael R. Foster, Salisbury, both of England

[73] Assignee: Plessey Overseas Ltd., Ilford, England

[21] Appl. No.: 541,026

[22] Filed: Oct. 12, 1983

[30] Foreign Application Priority Data

Oct. 12, 1982 [GB] United Kingdom ................. 8229134

[51] Int. Cl.³ .............................................. G01C 17/38
[52] U.S. Cl. .................................... 33/356; 33/363 R; 33/361; 33/357
[58] Field of Search ................. 33/363 R, 352, 355 R, 33/356, 357, 361, 362

[56] References Cited

U.S. PATENT DOCUMENTS

| | | | |
|---|---|---|---|
| 3,991,361 | 11/1976 | Mattern et al. | 33/356 |
| 4,143,467 | 3/1979 | Erspamer et al. | 33/356 |
| 4,179,741 | 12/1979 | Rossani | 33/356 |
| 4,300,390 | 11/1981 | Shimizu | 33/361 |
| 4,412,387 | 11/1983 | Lenko | 33/361 |
| 4,413,424 | 11/1983 | Sasaki et al. | 33/361 |
| 4,414,753 | 11/1983 | Moulin et al. | 33/356 |
| 4,429,469 | 2/1984 | Tsushima et al. | 33/361 |

FOREIGN PATENT DOCUMENTS 2020037A 11/1979 United Kingdom .
1579673 11/1980 United Kingdom .

Primary Examiner—Willis Little
Attorney, Agent, or Firm—Fleit, Jacobson, Cohn & Price

[57] ABSTRACT

An electronic compass for vehicles comprising three magnetic sensors arranged in use to be respectively responsive to orthogonal components of a magnetic field which includes the earth's magnetic field and a spurious magnetic field which is associated with the vehicle, for producing electrical signals corresponding to said components, tilt sensor means responsive to vehicle tilt with respect to the horizontal plane, data processor and storage means arranged to store signals derived from the sensors as the vehicle is turned through a compass setting cycle, and signal processor means responsive to electrical signals produced by the sensors after the setting cycle has been completed and to the signals stored during the setting cycle, for providing compensated signals related to the bearing appertaining to the heading of the vehicle in which the effects of the spurious magnetic field are compensated for and further processor means to which the compensated signals are applied and which is responsive to the tilt sensor means for modifying the compensated signals to produce output signals appertaining to vehicle heading in which the effects of tilt are compensated for.

4 Claims, 6 Drawing Figures

COMPASS

This invention relates to electronic compasses and to navigation systems including such compasses and more especially it relates to such compasses and navigation systems for use in vehicles.

The term vehicle when used herein is intended to include ships, boats or aircraft as well as land based vehicles such as cars, lorries or military vehicles and the term electronic compass as used herein defines a compass in which a bearing indication is afforded in dependence upon electronic signals provided by megnetic sensors responsive to the earths magnetic field.

Modern vehicles are constructed principally from steel or include significant steel parts having magnetic characteristics which distort the earth's magnetic field in and around the close proximity of the vehicle. Although electronic compasses per se are known, their use has hitherto been strictly limited in vehicles, since magnetic sensors essential to such compasses must either be placed on masts or extension arms in order to avoid spurious magnetic fields associated with the vehicle and the use of masts or the like is often not possible or at least undesirable, or be subjected to an elaborate compensation process.

An important object of the present invention is to provide for a vehicle an electronic compass or a navigation system including such a compass, wherein spurious magnetic fields associated with the vehicle are compensated for, such that magnetic sensors forming a part of the compass may be accommodated within or close to the vehicle in which the compass is carried and additionally to provide means effective to compensate for the effects of vehicle tilt.

According to the present invention an electronic compass for vehicles comprises three magnetic sensors arranged in use to be respectively responsive to orthogonal components of a magnetic field which includes the earth's magnetic field and a spurious magnetic field which is associated with the vehicle, for producing electrical signals corresponding to said components, tilt sensor means responsive to vehicle tilt with respect to the horizontal plane, data processor and storage means arranged to store signals derived from the sensors as the vehicle is turned through a compass setting cycle, and signal processor means responsive to electrical signals produced by the sensors after the setting cycle has been completed and to the signals stored during the setting cycle, for providing compensated signals related to the bearing appertaining to the heading of the vehicle in which the effects of the spurious magnetic field are compensated for and further processor means to which the compensated signals are applied and which is responsive to the tilt sensor means for modifying the compensated signals to produce output signals appertaining to vehicle heading in which the effects of tilt are compensated for.

By causing the vehicle to move through a predetermined compass setting cycle, data is made available and stored which appertains to three orthogonal axes, subsequently to be urilised by the signal processor to compensate for the spurious magnetic field associated with the vehicle, whereby the provision of signals indicative of a magnetic compass bearing appertaining to the heading of the vehicle is facilitated which is modified to compensate for vehicle tilt.

The setting cycle may be performed in any manner which will produce a response from each of the three sensors as the vehicle is moved through various headings and tilts. These will be chosen in accordance with the type of manoeuvre which can be carried out by the vehicle concerned.

The tilt sensor means may comprise mechanical or electro-mechanical tilt sensors responsive to vehicle tilt to which the three magnetic sensors are subject to provide the tilt of the magnetic sensors in two orthogonal planes.

If the magnetic field detected by the three orthogonal sensors is plotted in three dimensions in a co-ordinate system then a surface locus would be obtained for all values of vehicle bearing and tilt. Under ideal conditions this surface would be spherical but due to the effects of spurious magnetic fields associated with a vehicle, the ideal shape is distorted to the form of an ellipsoid.

By using the stored values of magnetic field sensed during the setting cycle in a transform to convert the values of magnetic field measured on the ellipsodial locus back to the spherical locus, output signals appertaining to true bearing or heading can be computed.

The spurious magnetic field associated with a vehicle may be considered to be the combination of a permanent magnetic field and an induced magnetic field, and by utilising signal values sensed and stored during the compass setting cycle, a transform is derived which is applied in the signal processor to provide compensation for the permanent magnetic field and the induced magnetic field associated with the vehicle, even if these fields are very large, whereby the provision of an unambiguous bearing indication is afforded.

Although a transform utilising a compreheansive set of stored values sufficient to define a complete three dimensional surface locus which is in the form of an ellipsoid would be ideal, a comparatively simple transform may be satisfactory which utilises a set of nine values which are spaced apart over the three dimensional surface of the ellipsoidal magnetic locus and which may be measured during a simple setting cycle vehicle manoeuvre or series of manoeuvres.

Accordingly the data storage means may include capacity to store data corresponding to or derived from the nine values sensed by each of the sensors during the setting cycle, these values being defined as $x_1$ to $x_9$, $y_1$ to $y_9$ and $z_1$ to $z_9$ for the three orthogonal magnetic sensors respectively and the signal processor means may be adapted to solve an equation utilising these values to provide the bearing indication.

One embodiment of the invention will now be described solely by way of example with reference to the accompanying drawings in which.

If operation of a compass is required on a vehicle whose attitude will at times be significantly tilted, such as an aircraft or a cross country vehicle, the use of a strapped down two axis sensor as described in Great Britain Pat. No. 2,130,729, corresponding to U.S. patent application Ser. No. 541,052, will lead to errors caused by the inability of the tilted sensors to sense the horizontal components of the earth's magnetic field. The technique described in Great Britian Pat. No. 2,130,729 can however be extended to a three axis sensor where the three axes are arranged orthogonally.

Figure 1:
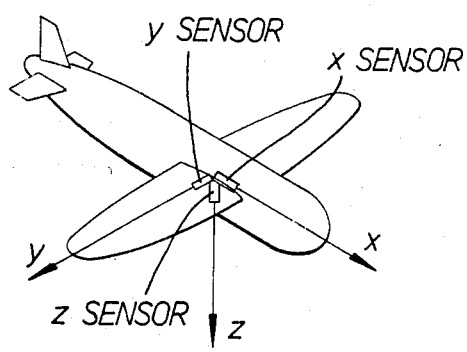
FIG. 1 is a somewhat schematic perspective view of an aircraft showing the three axes of interest x,y, and z.
Figure 2:
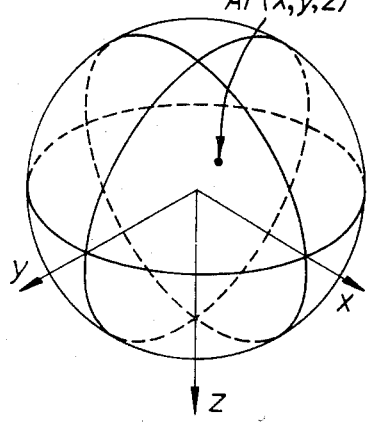
FIG. 2 is a diagram of a spherical locus of the magnetic field along the x,y,z axes as unaffected by spurious fields associated with other aircraft.

Referring now to FIG. 1 a three axis magnetometer is mounted in the vehicle, e.g. in an aircraft, to measure the magnetic field sensed along the longitudinal axis of the aircraft, x, along the transverse axis of the aircraft, y, and along the vertical axis, z. The local magnetic field in the vicinity of these sensors is a combination of the earth's magnetic field and spurious magnetic fields due to the ferromagnetic parts of the vehicle. If no spurious magnetic field were present and the components of the earth's magnetic field along the x,y and z axes are plotted out then a spherical locus in 3 dimensions would be obtained for all values of bearing, pitch and roll of the vehicle as shown in FIG. 2. The sphere is centred on the origin of the co-ordinate system and an arbitary point is defined as 'A' on the surface of the locus.

Figure 3:
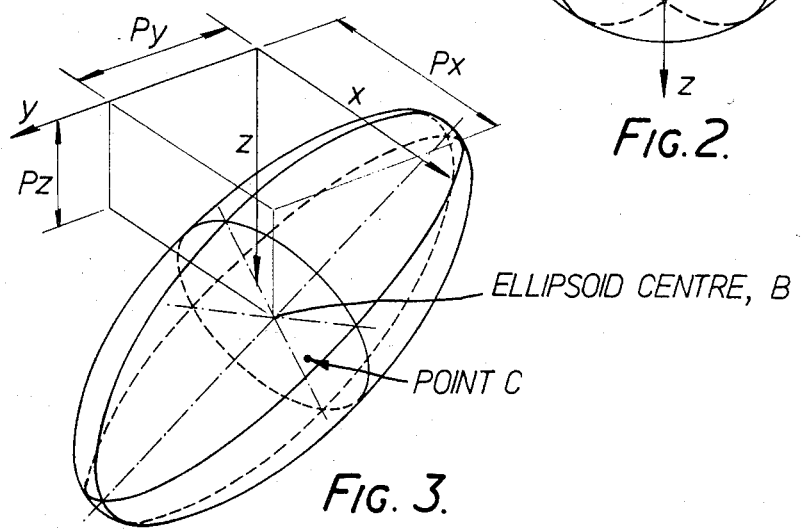
FIG. 3 is a diagram of an ellipisoidal locus along the x,y,z axes of a magnetic field which includes spurious fields associated with the aircraft.

In practice however the perfect spherical locus as shown in FIG. 2 is shifted from the origin of the coordinate system due to the permanent field of the vehicle and distorted into an ellipsoid due to the induced field of the vehicle to give the form of the locus shown in FIG. 3. In FIG. 3 the centre of the ellipsoid at point B has been shifted to a point $(P_x, P_y, P_z)$. In addition the sphere has been distorted into an ellipsoid with its major axes along definable directions such that the point 'A' is transformed to a point 'C' on the surface of the locus. In order to correct for this distortion of the sphere into an ellipsoid it is necessary to determine the parameters of the ellipsoid in order to convert the point C on the ellipsoid surface in FIG. 3 back into the equivalent point A on the spherical surface in FIG. 2. Then, from a knowledge of the x,y and z values for the spherical locus and the tilt of the vehicle in two planes, the bearing of the vehicle relative to magnetic north can be derived.

The equation describing the ellipsoidal surface in FIG. 3 can be written as:

$$ax^2 + by^2 + cz^2 + 2fyz + 2gzx + 2hxy + 2ux + 2vy + 2wz = d^2$$

where
X = magnetic field sensed by the longitudinal vehicle sensor
Y = magnetic field sensed by the transverse vehicle sensor
z = magnetic field sensed by the vertical vehicle sensor
a,b,c,f,g,h,u,v,w,d are constants for a defined location on the Earth's surface.

This equation can be solved in a number of ways to determine the constants in the equation, one example being to substitute nine separate x, y, z values into the equation, for different vehicle bearings and tilt, and to solve the resulting nine simultaneous equations for the nine coefficients a,b,c,f,g,h,u,v,w. Note that the constant d is a scaling factor, and can be given any convenient value. Choosing $d^2 = 1$ and taking the values of the field measured as $x_i, y_i, z_i$ for nine independent points on the locus with i=1 to 9, we obtain:

$$\begin{bmatrix} x_1^2 & y_1^2 & z_1^2 & 2y_1z_1 & 2z_1x_1 & 2x_1y_1 & 2x_1 & 2y_1 & 2z_1 \\ x_2^2 & y_2^2 & z_2^2 & 2y_2z_2 & 2z_2x_2 & 2x_2y_2 & 2x_2 & 2y_2 & 2z_2 \\ x_3^2 & y_3^2 & z_3^2 & 2y_3z_3 & 2z_3x_3 & 2x_3y_3 & 2x_3 & 2y_3 & 2z_3 \\ x_4^2 & y_4^2 & z_4^2 & 2y_4z_4 & 2z_4x_4 & 2x_4y_4 & 2x_4 & 2y_4 & 2z_4 \\ x_5^2 & y_5^2 & z_5^2 & 2y_5z_5 & 2z_5x_5 & 2x_5y_5 & 2x_5 & 2y_5 & 2z_5 \\ x_6^2 & y_6^2 & z_6^2 & 2y_6z_6 & 2z_6x_6 & 2x_6y_6 & 2x_6 & 2y_6 & 2z_6 \\ x_7^2 & y_7^2 & z_7^2 & 2y_7z_7 & 2z_7x_7 & 2x_7y_7 & 2x_7 & 2y_7 & 2z_7 \\ x_8^2 & y_8^2 & z_8^2 & 2y_8z_8 & 2z_8x_8 & 2x_8y_8 & 2x_8 & 2y_8 & 2z_8 \\ x_9^2 & y_9^2 & z_9^2 & 2y_9z_9 & 2z_9x_9 & 2x_9y_9 & 2x_9 & 2y_9 & 2z_9 \end{bmatrix} \cdot \begin{bmatrix} a \\ b \\ c \\ f \\ g \\ h \\ u \\ v \\ w \end{bmatrix} = \begin{bmatrix} 1 \\ 1 \\ 1 \\ 1 \\ 1 \\ 1 \\ 1 \\ 1 \\ 1 \end{bmatrix}$$

Inverting this matrix, we obtain:

$$\begin{bmatrix} a \\ b \\ c \\ f \\ g \\ h \\ u \\ v \\ w \end{bmatrix} = \begin{bmatrix} x_1^2 & y_1^2 & z_1^2 & 2y_1z_1 & 2z_1x_1 & 2x_1y_1 & 2x_1 & 2y_1 & 2z_1 \\ x_2^2 & y_2^2 & z_2^2 & 2y_2z_2 & 2z_2x_2 & 2x_2y_2 & 2x_2 & 2y_2 & 2z_2 \\ x_3^2 & y_3^2 & z_3^2 & 2y_3z_3 & 2z_3x_3 & 2x_3y_3 & 2x_3 & 2y_3 & 2z_3 \\ x_4^2 & y_4^2 & z_4^2 & 2y_4z_4 & 2z_4x_4 & 2x_4y_4 & 2x_4 & 2y_4 & 2z_4 \\ x_5^2 & y_5^2 & z_5^2 & 2y_5z_5 & 2z_5x_5 & 2x_5y_5 & 2x_5 & 2y_5 & 2z_5 \\ x_6^2 & y_6^2 & z_6^2 & 2y_6z_6 & 2z_6x_6 & 2x_6y_6 & 2x_6 & 2y_6 & 2z_6 \\ x_7^2 & y_7^2 & z_7^2 & 2y_7z_7 & 2z_7x_7 & 2x_7y_7 & 2x_7 & 2y_7 & 2z_7 \\ x_8^2 & y_8^2 & z_8^2 & 2y_8z_8 & 2z_8x_8 & 2x_8y_8 & 2x_8 & 2y_8 & 2z_8 \\ x_9^2 & y_9^2 & z_9^2 & 2y_9z_9 & 2z_9x_9 & 2x_9y_9 & 2x_9 & 2y_9 & 2z_9 \end{bmatrix}^{-1} \cdot \begin{bmatrix} 1 \\ 1 \\ 1 \\ 1 \\ 1 \\ 1 \\ 1 \\ 1 \\ 1 \end{bmatrix}$$

from which the values of a,b,c,f,g,h,u,v and w can be derived.

One method of deriving and using the coefficients a,b,c,f,g,h,u,v,w to correct the magnetometer readings for the presence of the vehicle is illustrated. Nine calibration points need to be chosen in accordance with the type of manoeuvre which can be carried out by the vehicle—for instance four points from each of a left and right banked turn, plus one straight and level flight value form an acceptable set for an aircraft, while for a land vehicle the two sets of four points can be obtained in a different way by driving in a circle on ground having two different slopes. Many other sets of manoeuvers and methods of selecting points can be devised, but in each case the objective is to measure the three components of magnetic field at nine points which are well spaced over the three dimensional surface of the magnetic locus which is in the form of the ellipsoid as shown in FIG. 3.

It is also possible to select more than nine points. In this case it is necessary to select the values of the constants a,b,c,f,g,h,u,v and w which provide the best fit of an ellipsoid through all the points selected.

Figure 4:
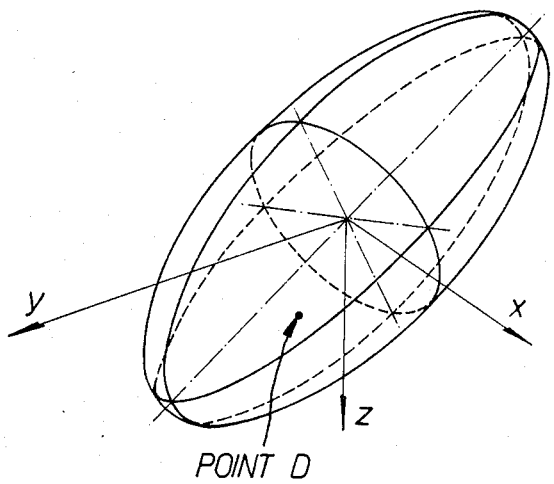
FIG. 4 is a diagram of an ellipisoidal locus of a magnetic field which corresponds to the locus of FIG. 3 but with a component corresponding to the temperature magnetic field of the aircraft subtracted.
Figure 5:
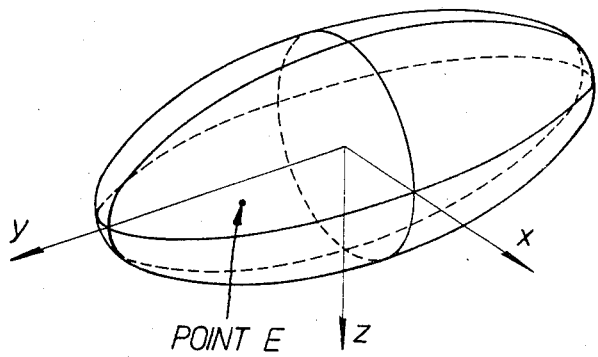
FIG. 5 is a diagram of an ellipisoidal locus corresponding to the locus of FIG. 4 but with its axes rotated such that they lie along the axes x, y and z.

The process of calculating the correction data for magnetic effects due to the vehicle is equivalent to the following process which will hereinafter be mathematically explained and also later described with reference to FIG. 6:

(i) A translation of the x, y and z coordinate system to centre the ellipsoid by determination of $P_x$, $P_y$, $P_z$, such that the point 'C' is transformed to a point 'D' on the surface of the locus shown in FIG. 4;

(ii) A rotation of the x, y and z coordinate system to the ellipsoid axes, such that the point 'D' is transformed to a point 'E' on the surface of the locus shown in FIG. 5;

(iii) Scaling of the x, y and z coordinate axes to change the ellipsoid to a sphere; and, (iv) Rotation of the sphere back to the correct orientation i.e. the inverse of step (ii), such that the point 'E' is transformed to the point 'A' on FIG. 2.

The values to be used in the above processes are derived from the values obtained for a,b,c,f,g,h,u,v and w as follows. First the coordinates $(P_x, P_y, P_z)$ for the centre of the ellipsoid are given by:

$$\begin{bmatrix} P_x \\ P_y \\ P_z \end{bmatrix} = \begin{bmatrix} bc - f^2 & gf - hc & hf - bg \\ fg - hc & ac - g^2 & hg - af \\ hf - bg & hg - af & ab - h^2 \end{bmatrix} \cdot \begin{bmatrix} -u \\ -v \\ -w \end{bmatrix} \times 1/\det G$$

where $$G = \begin{bmatrix} a & h & g \\ h & b & f \\ g & f & c \end{bmatrix}$$

$\det G$ = the determinant of matrix G.
$= a(bc - f^2) - h(hc - gf) + g(hf - bg)$ If the (x,y,z) component values are translated to the position of the centre of the ellipsoid then the equation of the ellipsoid in the new coordinate system would be the same as the ellipsoid equation above but with the terms in u,v and w equal to zero and d replaced by $d_1$ where $$d_1{}^2 = [aP_x{}^2 + bP_y{}^2 + cP_z{}^2 + 2fP_yP_z + 2gP_xP_z + 2hP_xP_y + 2uP_x + 2vP_y + 2wP_z] + d^2$$

To derive the direction cosines of the three orthogonal axes of the ellipsoid relative to the (x,y,z) coordinate system it is necessary to first obtain the three eigenvalues $L_1$, $L_2$, $L_3$ of the matrix G. These three values of L are obtained from the three solutions for L of the cubic equation:

$$L^3 - AL^2 + BL - C = 0$$

where $A = a + b + c$ $B = bc + ca + ab - f^2 - g^2 - h^2$ $C = abc - af^2 - bg^2 - ch^2 + 2fgh$ The three solutions for L for the cubic equation are:

$L_1 = D_1 + \tfrac{1}{3}A$ $L_2 = D_2 + \tfrac{1}{3}A$ $L_3 = D_3 + \tfrac{1}{3}A$ where $D_1 = 2\sqrt{(P/3)} \, \cos(\tfrac{1}{3}\alpha)$ $D_2 = -2\sqrt{(P/3)} \, \cos(\tfrac{1}{3}\alpha + \tfrac{1}{3}\pi)$ $D_3 = -2\sqrt{(P/3)} \, \cos(\tfrac{1}{3}\alpha - \tfrac{1}{3}\pi)$ $\alpha = \cos^{-1}\left[\dfrac{Q}{2(P/3)^{3/2}}\right]$ $P = \tfrac{1}{3}A^2 - B$
$Q = 2[\tfrac{1}{3}A]^3 - \tfrac{1}{3}AB + C$ The direction cosines $l_i$, $m_i$, $n_i$ of each of the three axes of the ellipsoid in turn can be found from the following equations using $L_i$ with i=1, 2 and 3 to define each of the three axes of the ellipsoid.

$l_i = R_l/R_o$ $m_i = R_m/R_o$ $n_i = R_n/R_o$ where $R_l = (b - L_i)(c - L_i) - f^2$ $R_m = fg - h(c - L_i)$ $R_n = fh - g(b - L_i)$ $R_o = R_l{}^2 + R_m{}^2 + R_n{}^2$ The scaling factors to convert the ellipsoid into a sphere of radius $d_1$ are $s_x = \sqrt{L_1}$ $s_y = \sqrt{L_2}$ $s_z = \sqrt{L_3}$ When the above data have been calculated, further data may be used to improve the accuracy if required.

The operating sequence for the compass uses the calibration data derived above as follows.

Commencing with a magnetometer reading (x, y, z) taken simultaneously with an attitude reading (P, R), the first stage is to calculate a corrected magnetometer reading. This is done as follows, using the calibration data $(P_x, P_y, P_z)$ for translation, $(l_1, m_1, n_1)$, $(l_2, m_2, n_2)$, $(l_3, m_3, n_3)$ for rotation and $(s_x, s_y, s_z)$ for scaling.

Translation:
$x_1 = x - P_x$
$y_1 = y - P_y$
$z_1 = z - P_z$
Rotation:

-continued $$\begin{bmatrix} x_2 \\ y_2 \\ z_2 \end{bmatrix} = \begin{bmatrix} l_1 & m_1 & n_1 \\ l_2 & m_2 & n_2 \\ l_3 & m_3 & n_3 \end{bmatrix} \cdot \begin{bmatrix} x_1 \\ y_1 \\ z_1 \end{bmatrix}$$

Scaling:

$$\begin{bmatrix} x_3 \\ y_3 \\ z_3 \end{bmatrix} = \begin{bmatrix} s_x & x_2 \\ s_y & y_2 \\ s_z & z_2 \end{bmatrix}$$

Inverse rotation:

$$\begin{bmatrix} x_4 \\ y_4 \\ z_4 \end{bmatrix} = \begin{bmatrix} l_1 & l_2 & l_3 \\ m_1 & m_2 & m_3 \\ n_1 & n_2 & n_3 \end{bmatrix} \cdot \begin{bmatrix} x_3 \\ y_3 \\ z_3 \end{bmatrix}$$

The second stage is then to adjust the corrected magnetic readings for attitude:

$$\begin{bmatrix} B_A \\ B_B \\ B_C \end{bmatrix} = \begin{bmatrix} \cos P & \sin P \sin R & \sin P \cos R \\ 0 & \cos R & -\sin R \\ -\sin P & \sin R \cos P & \cos R \cos P \end{bmatrix} \cdot \begin{bmatrix} x_4 \\ y_4 \\ z_4 \end{bmatrix}$$

where P=pitch angle and R=roll angle. P and R are the Euler rotations relative to the x, y, z axes of the vehicle.

Then the heading is given by $$H = -\tan^{-1} [B_B/B_A[$$

where by taking account of the sign of $B_B$ and $B_A$ the vehicle heading, H, can be defined from 0° to 360° and the dip angle by $$D = \tan^{-1} \left[ \frac{B_C}{\sqrt{B_A^2 + B_B^2}} \right]$$

The resulting heading can then be displayed as a bearing indication to the pilot of the vehicle or combined with a vehicle velocity sensor 110 giving the vehicle velocity along its longitudinal and, if necessary, along its transverse axis to provide a navigation system via distance measuring apparatus 112 and locator 114 processing additional inputs 33 and 34 along with the output of the distance measuring apparatus 112 applied thereto, see United Kingdom Pat. No. 2,130,723, corresponding to U.S. patent application Ser. No. 541,052.

Figure 6:
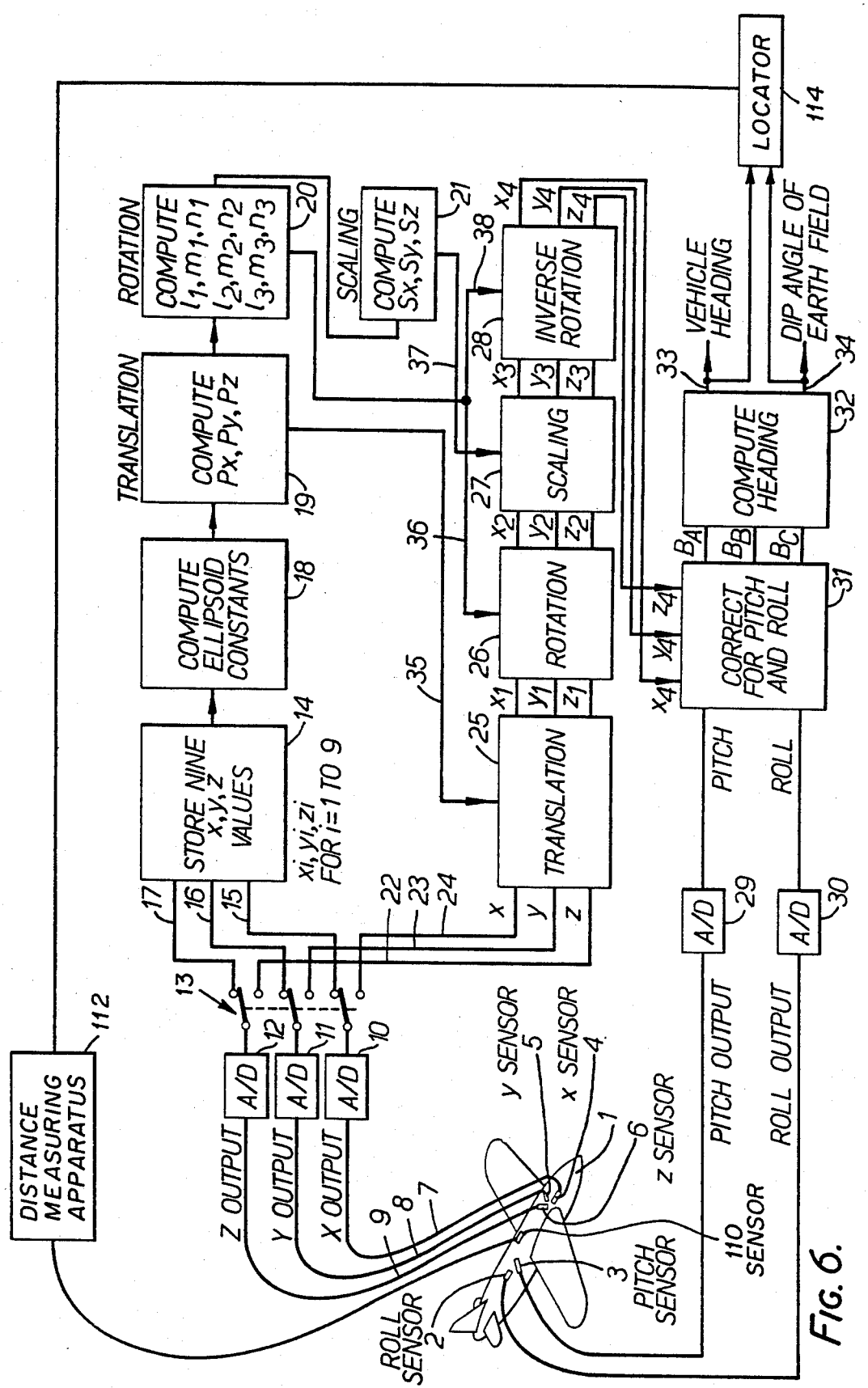
FIG. 6 is a somewhat schematic block flow diagram illustrating various stages in mathematical processing associated with an electronic compass.

The foregoing mathematical treatment will be better understood if reference is made to the flow diagram FIG. 6.

Referring now to the flow diagram of FIG. 6, an electronic compass is mounted in an aeroplane 1 and includes a roll sensor 2 and a pitch sensor 3. Pitch and roll sensing are well established techniques and may be carried out with any known apparatus. The aircraft is arranged also to carry x,y and z magnetic sensors 4,5 and 6 which are respectively responsive to orthogonally related magnetic fields. Outputs from the x,y and z sensors 4,5 and 6 are fed via lines 7,8 and 9 to analogue to digital converters 10,11 and 12 respectively. The analogue to digital converters are arranged to feed a processor via a switch 13 which in the position shown in the drawings is set for calibration such that signals from the A to D converters 10,11 and 12 are fed to a calibration section of the compass. The calibration section of the compass comprises a store 14 for the field measurements for $x_i$, $y_i$ and $z_i$ each of which comprise nine independent points on the locus. The store 14 is fed from the switch 13 via input lines 15,16 and 17 respectively. The store 14 is arranged to feed a signal processor 18 which serves to compute the coefficients a,b,c,f,g,h,u,v and w respectively. The processor 18 is arranged to feed a translation unit 19 which operates to compute the parameters $P_x$, $P_y$ and $P_z$ respectively. A rotation processor 20 is provided which serves to compute the values $l_i$, $m_i$ and $n_i$ for i=1,2 and 3, and the rotation processor 20 is arranged to feed a scaling unit 21 which serves to compute the scaling factors $s_x$, $s_y$ and $s_z$.

When the switch 13 is moved from calibration to run, input signals from the A to D converters 10,11 and 12 are fed via lines 22,23 and 24 to translation, rotation, scaling, and inverse rotation units 25,26,27 and 28 respectively which perform the functions hereinbefore described and which are serially connected and which serve to produce $x_4, y_4$ and $z_4$ output signals as indicated in the drawings which are indicative of the magnetic field along x,y and z axes which would obtain in the absence of the aircraft.

The pitch and roll sensors 2 and 3 are arranged to feed A to D converters 29 and 30 which provide digital pitch and roll signals for a pitch and roll correction unit 31 to which signals from the inverse rotation unit 28 are fed. Output signals $B_A$, $B_B$ and $B_C$ from the unit 31 computed as hereinbefore explained are fed to a processor 32 which serves to compute the vehicle heading and the dip angle of the earth's magnetic field and to provide appropriate output signals on the lines 33 and 34. The translation unit 25, the rotation unit 26, the scaling unit 27 and the inverse rotation unit 28 receive appropriate correction signals which have been derived and stored in processors 19,20 and 21 during the calibration cycle and which are then applied on lines 35, 36, 37 and 38 respectively from the calibration section of the compass.

The precise mode of operation of the units just before referred to with reference to FIG. 6 is described in the mathematical treatment of the system which has been previously therein before explained.

We claim:

1. A navigation system for vehicles which includes an electronic compass comprising three magnetic sensors arranged in use to be respectively responsive to orthogonal components of a magnetic field which includes the earth's magnetic field and a spurious magnetic field which is associated with the vehicle, for producing electrical signals corresponding to said components, tilt sensor means responsive to vehicle tilt with respect to the horizontal plane, data processor and storage means arranged to store signals derived from the sensors as the vehicle is turned through a compass setting cycle, and signal processor means responsive to electrical signals produced by the sensors after the setting cycle has been completed and to the signals stored during the setting cycle, for providing compensated signals related to the bearing appertaining to the heading of the vehicle in which the effects of the spurious magnetic field are compensated for and further processor means to which the compensated signals are applied and which is responsive to the tilt sensor means for modifying the compensated signals to produce compass output signals appertaining to vehicle heading in which the effects of tilt are compensated for, the system including also, means for sensing the velocity of the vehicle in which the compass is mounted, data infeed means operable for providing data appertaining to an original map reference, navigation computer means responsive to data signals derived from the velocity indicator, the compass output signals, and the data infeed means for providing data for display means whereby the display means is arranged to provide a display indicative of the position or location of the vehicle.

2. A navigation system for vehicles as claimed in claim 1 wherein the tilt sensor means comprises mechanical or electro-mechanical tilt sensors responsive to vehicle tilt to which the two magnetic sensors are subject, to provide signals appertaining to the tilt of the magnetic sensors in two orthogonal planes.

3. A navigation system for vehicles as claimed in claim 1 wherein the data storage means includes capacity to store data corresponding to or derived from nine values sensed by each of the sensors during the setting cycle and wherein the signal processor means is adapted to solve an equation utilizing these values to provide the bearing indication.

4. A navigation system for vehicles which includes an electronic compass comprising three magnetic sensors arranged in use to be respectively responsive to orthogonal components of a magnetic field which includes the earth's magnetic field and a spurious magnetic field which is associated with the vehicle, for producing electrical signals corresponding to said components, tilt sensor means responsive to vehicle tilt with respect to the horizontal plane, data processor and storage means arranged to store signals derived from the sensors as the vehicle is turned through a compass setting cycle, and signal processor means responsive to electrical signals produced by the sensors after the setting cycle has been completed and to the signals stored during the setting cycle, for providing compensated signals related to the bearing appertaining to the heading of the vehicle in which the effects of the spurious magnetic field are compensated for and further processor means to which the compensated signals are applied and which is responsive to the tilt sensor means for modifying the compensated signals to produce compass output signals appertaining to vehicle heading in which the effects of tilt are compensated for, the system including also, distance measuring apparatus, and a computer responsive to said apparatus and to signals derived from the compass for providing output signals indicative of location in terms of map co-ordinates.

* * * * *